ns patented Aug. 1, 1967

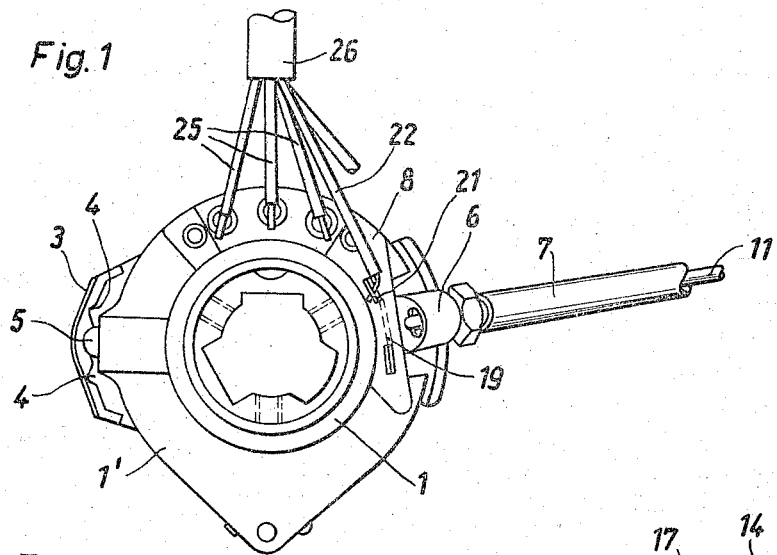
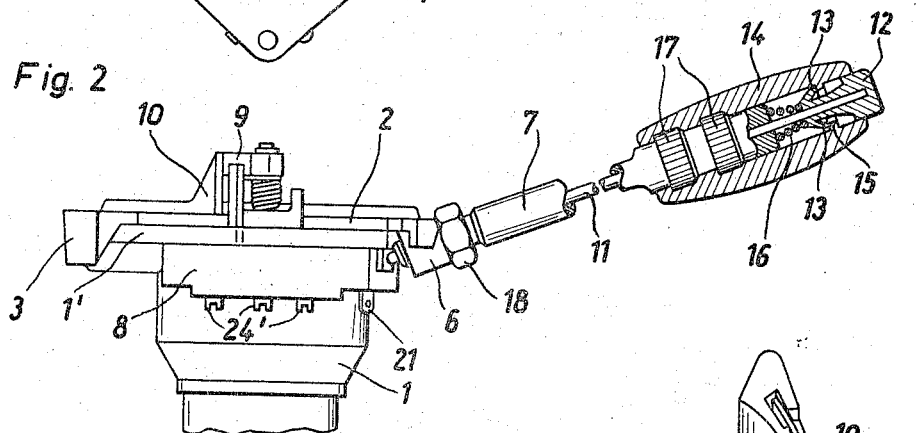
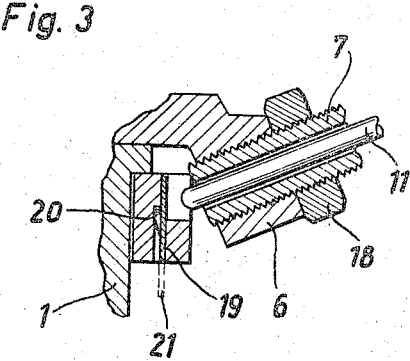
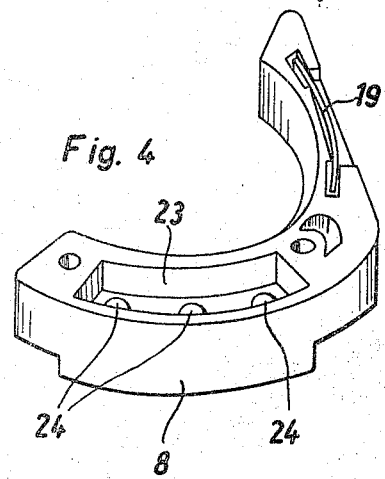

3,334,201
STEERING COLUMN SWITCH ASSEMBLY HAVING ADDITIONAL SWITCH MEANS FOR LIGHT DIMMING AND THE LIKE
Erich Mutschler and Albert Ziegler, Bietigheim, Wurttemberg, Germany, assignors to SWF-Spezialfabrik fur Autozubehor Gustav Rau GmbH., Bietigheim, Wurttemberg, Germany
Filed Feb. 16, 1965, Ser. No. 433,133
Claims priority, application Germany, Feb. 22, 1964, S 89,649
5 Claims. (Cl. 200—61.27)

The present invention relates to a steering column switch assembly for motor vehicles which is arranged below the hub of the steering wheel and whose switch lever, movable parallel to the plane of the steering wheel, extends about in the spoke direction to within proximity of the steering wheel circumference, and which includes an additional actuating member projecting from the end of the switch lever for closing a contact pair of an additional switch which can be actuated independently of the steering column switch.

This additional switch combined with the steering column switch is utilized preferably for the actuation of light signals by means of the headlights.

Known in the prior art are steering column switches with an additional head-light controlling device operated from the steering wheel, with which the actuation of the additional switch is effected by pivoting the switch lever of the steering column switch perpendicularly to the normal switching plane of the steering column switch. With these prior art constructions, the switch lever is supported tiltably at the housing of the steering column switch. The tiltable support of the switch lever, however, necessitates additional costs. The large lever ratio between the contact path and the lever path is also unfavorable as a contact path of between two to three mm. requires a tilting of the switch lever at the handle end by several centimeters. Furthermore, it is of disadvantage with this prior art switch construction that the contact parts have to be manufactured within narrow tolerances and have to be assembled for the most part in a complicated manner. Furthermore, the contact path with this known type of switch cannot be adjusted and readjusted subsequently. It is additionally of disadvantage with such prior art constructions that the switch lever cannot be exchanged or readily installed subsequently so that the switch has to be shipped and stocked with assembled and installed lever which involves considerable costs with such bulky parts. Furthermore, these switches have a tendency for the most part to produce rattling noises during the drive already after a relatively short time by reason of a loosening and wobbling of the lever.

These disadvantages are avoided in part with a steering column switch with which the switch lever is only pivotally but not tiltably supported, and in which the additional switch is accommodated at the end of the switch lever. Unfavorable with this type of prior art construction is, however, that the current feed conductors have to be extended up to the switch lever end. There exists the danger with such prior art construction during the installation of the current supply cable that the insulation thereof will be damaged and a connection with ground will ensue. Ground connections also may occur with such prior art only subsequently as upon actuation of the steering column switch the cable which leads to the additional switch, is taken along during each movement and may thereby be abraded and worn off with an unfavorable position of the cable.

Furthermore, it is of disadvantage with such prior art construction that though the switch lever can be exchanged more readily than with the first-mentioned construction, an exchange entails also in this case great difficulties since the cable to the additional switch is rigidly secured thereat so that during exchange of the lever also the cable for the additional switch has to be exchanged always. It is extremely difficult to lay the new cable subsequently again in an appropriate and expert manner as the same is included in the original construction within the cable tubing or sheath which surrounds the individual cables for the steering column switch.

With the steering column switches in which the additional switch is accommodated at the switch lever end, there exists two types of construction. With one type of construction the actuating member is arranged at the end face of the lever end so that the actuating direction corresponds to the axial direction of the switch lever; with the other type of construction, the actuating member is supported at the underside of the lever end. The actuation thereby takes place in the direction toward the steering wheel.

The customary steering column switches for motor vehicles are desired frequently both with the additional switch for the headlight controlling device operated from the steering wheel and without this additional switch. With the known prior art constructions, it was not possible heretofore to install subsequently the additional switch in a rapid and simple manner at the steering column switch. Hence, two types of steering column switches, namely those with additional switch and steering column turn indicator switch and those without additional switch had to be stocked. With the switches in which the lever is threadably connected at the steering column switch, it is possible to stock switch levers with the additional switch and switch levers without additional switch. However, as already mentioned above, it is extremely difficult with this construction to properly install the cable for the additional switch subsequently.

The present invention is concerned with the task to create a steering column switch assembly for the turn indicator lights with an additional switch adapted to be actuated independently thereof with which the aforementioned disadvantages are avoided in a far-reaching manner.

This task is solved in accordance with the present invention with a steering column switch assembly of the type described above such that the actuating member of the additional switch is constructed as a rod which corresponds in its length approximately to the length of the switch lever and is guided therein, and that the additional switch or at least the contacts thereof are arranged in proximity of the bearing place of the switch lever in or at the steering column switch housing separate from the actuating member. It is thereby favorable to secure and arrange the metal contact strip cooperating with the actuating member in a self-locking manner within the housing of the additional switch consisting of insulating material in such a manner that the actuating member can contact the contact strip in every switch position of the switch lever. It is thereby of advantage to construct the housing for the additional switch as a unitary formed or molded part together with the contact housing of the steering column turn-indicator switch.

It is proposed according to a further feature of the present invention to arrange the actuating member at an inclination to the metal contact strip so that in case of contact engagement, a friction occurs between the actuating member and the contact strip by means of which possible contact dirt and soiling may be eliminated. The indicated arrangement of the actuating member is particularly desirable when the inner end of the actuating member serves as counter-contact. If a pair of contacts is provided which is only closed by the actuating member, then a small friction between the two contacts will also occur with inclined engagement of the actuating member and corresponding free support of the one contact which at least slows down the formation of a layer harmful to making proper contact.

It is further of advantage to support the switch lever in an axially adjustable manner in order to enable an adjustment or readjustment of the actuating member. It is possible by the axially adjustable support of the switch lever to establish the respectively desired actuating stroke and to compensate for an eventual consumption of the contacts.

It is proposed in accordance with a still further feature of the present invention to construct the knob of the actuating member as formed or molded part of elastic plastic material with formed-in detent springs which engage behind an annuular bead of a handle sleeve that can also consist of elastic plastic material and is pressed upon the end of the switch lever of the steering column switch assembly. A compression spring is arranged within the free space between the switch lever and the inner end of the knob of the actuating member which holds the actuating member in the normally open position or presses the knob of the actuating member with its detent springs against the annular bead of the handle sleeve.

Accordingly, it is an object of the present invention to provide a steering column switch assembly for motor vehicles which avoids by extremely simple means the aforementioned disadvantages encountered with the prior art constructions.

Another object of the present invention resides in the provision of a steering column switch assembly for motor vehicles which offers a turn indicator switch and an optional headlight indicator switch, yet is relatively inexpensive in manufacture and assembly and assures reliable operation for long periods of time.

A further object of the present invention resides in the provision of a steering column switch assembly of the type described above which obviates the need for narrow tolerances in the manufacture of the parts thereof, permits easy assembly of the parts, and ready interchange of any worn parts.

A further object of the present invention resides in the provision of a steering column switch assembly of the type described above which obviates the need for carrying in stock a great number of relatively bulky parts.

Still another object of the present invention resides in the provision of a steering column switch assembly operable to provide turn indicator light switching and headlight switching which assures satisfactory operation, free of rattles and which facilitates readjustments in case of need.

A still further object of the present invention resides in the provision of a steering column switch assembly that avoids in a far-reaching manner damage to the electric cable insulation, thus preventing faulty operations, yet permits simple interchange of parts in case of need.

Another object of the present invention resides in the provision of a steering column switch assembly for selectively turning on and off the turn indicator lights which can be readily converted, at any time, into a dual purpose switch assembly for additionally and selectively controlling simultaneous turning on of the headlights as additional signal indication.

Another object of the present invention resides in the provision of a steering column switch assembly so constructed and arranged that the additional auxiliary switch assures a self-cleaning action of the contacts thereof and permits readjustment in case of damage to the switch contacts due to arcing, etc.

These and other objects, features, and advantages of the present invention will become more obvious from the following description when taken in connection with the accompanying drawing which shows, for purposes of illustration only, one embodiment in accordance with the present invention, and wherein:

FIGURE 1 is a plan view, as seen from the bottom, of a steering column switch assembly in accordance with the present invention which serves for purposes of giving turn indicator signals;

FIGURE 2 is an elevational view of the steering column switch assembly of FIGURE 1 with a switch lever end according to the present invention shown in cross-section;

FIGURE 3 is a partial cross-sectional view through the switch assembly, indicating the securing details of the switch lever with the additional switch; and FIGURE 4 is a perspective view of the contact housing which constitutes an integral formed or molded part together with the housing for the additional switch.

Referring now to the drawing wherein like reference numerals are used throughout the various views to designate like parts, the steering column switch assembly illustrated in the drawing is composed essentially of a sleeve-shaped housing 1 surrounding the steering column and provided with an abutment rim 1' on which is placed a switch ring 2 which is provided on one side thereof with a detent extension 3 having detent apertures or recesses 4 for a ball spring 5 spring supported in the abutment rim 1' of the switch housing 1 and which carries on the other side thereof a securing extension 6 for the switch lever 7. A contact housing 8 of insulating material is additionally arranged at the housing 1 as well as elastic or springy return cams 9 which effect by way of abutments 10 at the switch ring 2 an automatic return of the steering column switch, as is well known with turn indicators of this type.

A rod-like actuating member 11 is displaceably supported within the switch lever 7. The actuating member 11 carries at the outer end thereof a knob 12 which consists of an elastic plastic material and on which are formed detent springs 13 that engage behind an annular bead 15 of a handle sleeve 14 and are pressed against the annular bead 15 by compression coil spring 16. The compression coil spring 16 can thereby be so constructed that it abuts with one turn rigidly at the actuating member for better contact with the negative terminal of the battery. A further contact engagement takes place over the entire guide surface between the actuating member 11 and the switch lever 7. The handle sleeve 14, like the button 12, consists of elastic plastic material which is so yielding that the handle sleeve 14 can be pressed over the end of the switch lever whereby enlargements 17 are provided at the end of the switch lever 7 for the better retention of the handle sleeve 14.

The switch lever 7 is provided at its securing end with a thread so that it can be threaded into a threaded bore of the securing extension 6. The threaded connection can be secured and tightened by a counter-nut 18. After loosening the counter-nut 18, the switch lever 7 can be further threaded into the extension 6 or threaded back out of the same. By this more or less further threaded engagement of the switch lever 7 in the extension 6, a stroke adjustment of the actuating member 11 and a readjustment thereof is possible in case of contact consumption.

The inner end of the actuating member 11 which abuts by way of the switch lever 7 at the ground, is pressed during actuation thereof against a metal counter strip 19 which is inserted into an aperture of the housing 8 under prestress and is held therein in a self-locking manner by a nose portion 20. The contact strip 19 has a line connection extension 21 for a ground connection 22 to the headlight control relay (not shown). Contacts 24 for the turn indicator device are accommodated in a further recess 23 of the housing 8. The connections 24' for the contacts 24 for the lines 25 project from the bottom side of the housing 8. All lines are disposed within a cable tubing or sheath 26. Also the ground connection 22 is placed with all switches into the cable sheath 26.

If, for any unexpected reasons and unfavorable operation conditions, a high consumption of the contacts, for example, due to arcing, occurs between the contact strip 19 and the actuating member 11, then the contact strip 19 can, in the illustrated embodiment, be replaced readily and rapidly by a new contact strip. The consumption of the contact at the actuating member 11 can be compensated for by readjustment of the lever as mentioned above.

A contact spring (not shown) may be arranged at the housing 8 in addition to the contact strip 19 which is connected at all times with the ground so that the switch lever 7 and the actuating member 11 need not be made of conductive material but may be made preferably of plastic material.

Since the switch lever 7 is no longer connected in the steering column switch assembly of the present invention with the switch housing 1 by way of the ground cable, it is possible at any time to convert rapidly and simply a steering column switch assembly without headlight control switch actuating means by the interchange of the lever into a steering column switch light assembly provided with an actuating member for the headlight controls. The switch housing 1 and the switch lever 7 can be packed separately for shipment and during storage. Of great advantage is above all that only one type of steering column switch assembly has to be stocked. The many special wishes of the customers as regards color can now be fulfilled in a simple manner and relatively fast in that a lever with the desired color is installed. It is therefore only necessary to stock the levers with the customary colors and no longer the entire steering column switch assembly.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. In a steering column switch assembly for motor vehicles which is arranged below the hub of the steering wheel and comprises switch housing means including a rotatable portion and a fixed portion, main switch means in said housing means for the turn indicator lights including switch lever means mounted on and rotatable with the rotatable portion of said housing means so as to be movable in a plane approximately parallel to the steering wheel plane and extending approximately in the radial direction up to within proximity of the steering wheel circumference, the improvement comprising additional switch means including a pair of separable contacts, actuating means for said pair of contacts operable independently of the main switch from the end of said switch lever means, an axially movable conductive rod supported within said switch lever means and corresponding in length thereto, one end of said rod being engaged by said actuating means for axially moving said rod, the other end of said rod remote from said actuating means forming one of the separable contacts, the remaining contact of said additional switch means being secured to the fixed portion of said housing in juxtaposition to said contact forming end of the rod, the contact forming end of the rod being axially movable to close on and engage the remaining contact upon the additional switch means being placed in its actuated condition and being withdrawn from and out of engagement with the remaining contact in the non-actuated condition of the additional switch means, the contact forming end of the rod, with the additional switch means in the actuated condition, being in engagement with and slidable along the remaining contact in all positions of the switch lever means.

2. A steering column switch assembly according to claim 1 wherein the remaining contact comprises a contact strip removeably secured in a self locking manner in the fixed portion of said housing means.

3. A steering column switch assembly according to claim 2 wherein said switch lever means including said rod is arranged at an inclination with respect to the surface of the remaining contact so that upon said switch lever means being moved to any of its positions with the additional switch means in the actuated condition, frictional rubbing occurs between the end of the rod and the surface of the remaining contact which eliminates contact soiling at the points of contact.

4. A steering column switch assembly according to claim 3 further comprising means for axially adjusting the position of said switch lever means relative to the fixed housing portion to enable an adjustment of the axial position of the contact forming end of the rod relative to the remaining contact.

5. A steering column switch assembly according to claim 4 wherein the actuating means comprises a knob of resilient plastic material secured to the end of the rod having unitary formed-in detent spring means, a handle sleeve secured to the switch lever means and provided with an annular bead for coacting with said detent spring means, and additional coil spring means coacting with the knob and the switch lever means normally biasing said rod out of engagement with remaining contact in the non-actuated condition of the additional switch means.

References Cited

UNITED STATES PATENTS

| | | | |
|---|---|---|---|
| 2,453,035 | 11/1948 | Ponsy | 200—4 |
| 2,671,354 | 3/1954 | Goos. | |
| 3,254,168 | 5/1966 | Peterson | 200—61.27 |

BERNARD A. GILHEANY, *Primary Examiner.*

H. A. LEWITTER, *Assistant Examiner.*